United States Patent [19]

Rossi

[11] Patent Number: 4,959,522
[45] Date of Patent: Sep. 25, 1990

[54] TRANSPARENT PRESSURE FOOT

[75] Inventor: Cristiano Rossi, Birmingham, Mich.

[73] Assignee: Chrysler Corporation, Highland Park, Mich.

[21] Appl. No.: 464,266

[22] Filed: Jan. 12, 1990

[51] Int. Cl.⁵ .............................................. B23K 26/06
[52] U.S. Cl. ............................. 219/121.75; 219/121.63
[58] Field of Search ...................... 219/121.63, 121.64, 219/121.73, 121.75

[56] References Cited

U.S. PATENT DOCUMENTS

| | | | |
|---|---|---|---|
| 3,304,403 | 2/1967 | Harper | 219/121.73 X |
| 3,383,491 | 5/1968 | Mancheryan | 219/121.75 X |
| 3,463,898 | 8/1969 | Takaoka et al. | 219/121.63 |

FOREIGN PATENT DOCUMENTS 0043791  2/1988  Japan ............................. 219/121.73

Primary Examiner—C. L. Albritton
Attorney, Agent, or Firm—Edward A. Craig

[57] ABSTRACT

A transparent pressure foot for use with laser welding and cutting systems and the like. The transparent pressure foot is positioned by means of a mount so that it makes contact with a surface with a predetermined force. The foot is composed of a material that is transparent to the laser energy at its particular frequency. The foot has a top surface for receiving the laser energy and a bottom surface for making contact with the surface. The laser energy is transmitted through the transparent pressure foot and is focused to a point below the bottom surface of the pressure foot. This permits pressure as well as laser energy to be applied to the same point on the surface to facilitate laser welding or cutting.

10 Claims, 1 Drawing Sheet

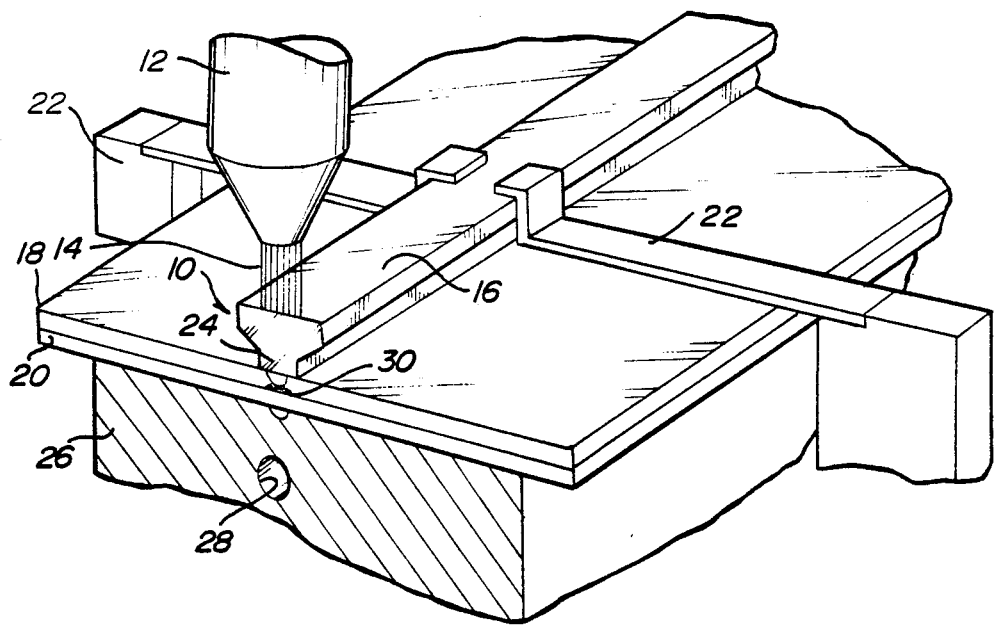
*Fig-1*
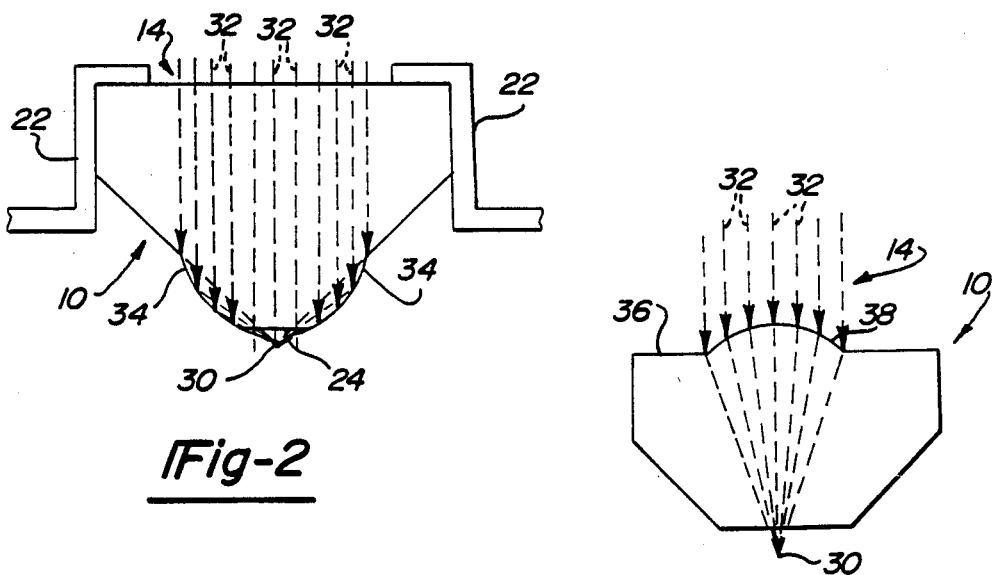
*Fig-2*
*Fig-3*

TRANSPARENT PRESSURE FOOT

BACKGROUND OF THE INVENTION

1. Field of the Invention

The present invention relates generally to laser welding and cutting systems, and more particularly, to a transparent pressure foot for use with laser welding and cutting systems and the like.

2. Description of Related Art

Lasers have numerous uses in manufacturing. Because of their ability to concentrate large amounts of energy to a small point, lasers are particularly well suited to cutting and welding operations. For example, laser welds have been found to result in a high strength weld. This results from high cooling rates due to low energy input per unit length of the weld, which is characteristic of lasers. Another advantage is that a laser weld often results in a purification of the fusion zone. Studies of laser welds show increases in hardness, tensile strength, impact energy, decrease in inclusion content, and oxygen and nitrogen content, as compared to the base metal. In addition, often the necessity for a filler material is avoided by using laser welding. Further, in spot welding, laser welding has the advantage of one side access, as opposed to the two side access required in conventional spot welding. Also, the laser spot weld is stronger and may often be leak tight.

Although the benefits are numerous, some difficulties are encountered in using lasers for welding and cutting. In particular, in those applications where a clamp or pressure foot must be applied to a material before the laser is applied, the clamp must be provided with a window, to permit the laser beam to reach the material. This window creates areas where no clamping takes place. In systems where the continuous application of pressure to the material is critical, for example, where two overlapping materials are to be joined by a laser, this window may allow a gap to exist because no pressure is applied where the window is. Also, the window must necessarily be relatively wide due to tolerances required and to the width of the laser beam above the focal point. A further problem with such windows, is that they generally extend over a limited linear distance, and thereby prevent the formation of a continuous weld.

Thus, one object of the present invention is to provide a means for applying laser energy as well as pressure to a surface at a given point. It is another object of the present invention to provide a means for producing laser welding or cutting in a material that is clamped without the use of a windowed clamp. It is another object of the present invention to provide a laser welding system that permits a relatively long and continuous weld in a clamped surface and that is not interrupted by the confines of a window in the clamp.

SUMMARY OF THE INVENTION

Pursuant to the present invention, an apparatus is provided for applying pressure to a surface while directing laser energy to the surface at the point of application of the pressure. The apparatus comprises a foot member composed of a material that is transparent to the laser energy at its particular frequency. The foot member has a top surface for receiving the laser energy and a bottom surface for making contact with the material. The bottom surface has a contour that conforms to a desired contour for the material. Also, the laser energy exits the foot member at this bottom surface. The apparatus also includes a mount for positioning the foot member in contact with the material with a predetermined force.

In accordance with another embodiment of the present invention, the foot member includes contours for directing and focusing portions of the laser energy toward the bottom surface. The contours may also be coated with a reflective material to facilitate reflection.

BRIEF DESCRIPTION OF THE DRAWINGS

The various advantages of the present invention will become apparent to one skilled in the art, by reading the following specification and by reference to the drawings in which:

FIG. 1 is a perspective view of the transparent pressure foot, partially in cross-section, in accordance with the present invention;

FIG. 2 is a cross-sectional view of a second embodiment of the transparent pressure foot in accordance with the present invention; and FIG. 3 is a cross-sectional view of a third embodiment of the transparent pressure foot in accordance with the present invention.

DESCRIPTION OF A PREFERRED EMBODIMENT

Referring now to FIG. 1, a transparent pressure foot 10 is shown. In accordance with the preferred embodiment, the transparent pressure foot 10 is used in a laser welding system. The laser welding system (not shown) may be a conventional carbon dioxide ($CO_2$) industrial laser including a laser head 12 capable of moving along a desired path to execute the weld. The industrial laser directs a beam of laser energy 14 through the laser head 12 where it enters the transparent pressure foot 10 at a top surface 16. Top surface 16 is preferably a substantially smooth planar surface positioned perpendicular to the axis of the laser beam 14. In this way, reflection of the laser beam 14 of the top surface 16 will be minimized and substantially all of the energy in the laser beam 14 will enter transparent pressure foot 10.

To minimize absorption of laser energy by transparent pressure foot, it will be appreciated that transparent pressure foot 10 is composed of a material that is transparent in the spectral region of the laser beam 14. $CO_2$ lasers typically emit infrared light at a wavelength of 10.6 microns. Accordingly, the material for the transparent pressure foot 10 should be chosen to have a high transmission at a wavelength of 10.6 microns. For example, silicon dioxide (quartz) may be used. Also, quartz has the added advantage in that it can be easily molded to a desired shape. In addition, quartz has a very low co-efficient of expansion and good heat resistance. In particular, the melting point of quartz is about 1600 degrees C., which is substantially above that of typical metals to be welded. For example, steel commonly has a melting point of 1400 degrees C., well below the melting point of quartz. This is important because the transparent pressure foot will be making contact with melted metal and, therefore, it is desirable for the pressure foot to be unaffected by the heat generated thereby. In addition, the pressure foot 10 should be constructed of a material having adequate compressive strength for the particular application. For example, quartz has been found to have adequate strength for sheet metal welding applications.

It will be appreciated that depending on the particular application, other materials may be used to construct the transparent pressure foot 10. For example, calcium fluoride, zinc selenide, and germanium are alternative materials which are used commonly with infrared wavelengths. It will also be appreciated that in some applications other types of lasers, such as ruby or yttrium-aluminum-garnite, etc. lasers may be employed. In these cases, other materials that have adequate transmission of the wavelengths of these other lasers should be used.

In accordance with the preferred embodiment, the transparent pressure foot 10 is used in conjunction with the laser system, to weld two pieces of sheet metal 18, 20 together. It will be appreciated that to accomplish the desired welds, the top sheet metal 18 should be in intimate contact with the bottom sheet metal 20 at the point of the weld. In general, this will require applying pressure at that point. In accordance with previous techniques, a clamp or foot was used to apply this pressure, the clamp being made of an opaque material such as steel. This required a window in the clamp to permit the laser beam 14 to reach the sheet metal 18 and 20. Unfortunately, the existence of the window meant that pressure was not applied at the point of the weld, and gaps could occur. This could result in an inadequate weld, and required higher energies to insure that both pieces of sheet metal 18 and 20 were fused.

In accordance with the present invention, transparent pressure foot 10 applies pressure at the precise point of the weld. This is accomplished by means of clamps 22 which engage with the top surface 16 of the pressure foot 10 to apply downward pressure on the pressure foot 10. The exact configuration of the clamps 22, as well as the number of such clamps, will depend on the particular configuration of the sheet metal and the application. Clamps 22 will include a means to adjust the force of the downward pressure on the pressure foot 10 to provide adequate pressure on top sheet metal 18 to insure that there are no gaps between top sheet metal 18 and bottom sheet metal 20.

Pressure foot 10 touches top sheet metal 18 at a bottom surface 24 which is substantially flat and parallel to the surface of top sheet metal 18. Bottom sheet metal 20 rests on a base 26 which is substantially flat to provide a surface to support top and bottom sheet metal 18 and 20 while the transparent pressure foot 10 applies pressure at the weld point. Base 26 may also include a water line 28 to facilitate rapid cooling of the weld.

In operation, the laser beam 14 will enter transparent pressure foot 10 at the top surface 16 and will exit the transparent pressure foot at the bottom flat surface 24. The laser head 12 will contain a conventional lens system (not shown) that will focus laser beam 14 to a point 30 near the interface between top sheet metal 18 and bottom sheet metal 20. With adequate pressure applied to the pressure foot 10 by means of clamp 22, transparent pressure foot 10 should press on top sheet metal 18 with a force adequate to prevent gaps between top sheet metal 18 and bottom sheet metal 20 at the weld point 30.

The concentrated energy from laser beam 14 will cause top sheet metal 18 and bottom sheet metal 20 to melt. Laser head 12 may then be moved along the axis of transparent pressure foot 10 to achieve a continuous weld line. Once the laser beam 14 has moved away from the interface point 30, the melted metal of top sheet metal 18 and bottom sheet metal 20 will harden causing the top sheet metal 18 and bottom sheet metal 20 to be fused at that point. This process may be assisted by the cooling effect of the water line 28.

It should be noted that during the cooling process, the bottom flat surface 24 is in intimate contact with the melted metal of top sheet metal 18. As a result, once the top sheet metal 18 has sufficiently cooled, and transparent pressure foot 10 is removed, the welded seam that results will conform to the flat surface of the bottom 24 of transparent pressure foot 10. This will result in an extremely flat and smooth weld line. In contrast, in conventional laser welding, the weld line is exposed to the air during cooling and the surface of the weld line is not smooth, and a distinct surface roughness between the unwelded sheet metal and the weld line results. By keeping the bottom surface 24 of the transparent pressure foot 10 in contact with the weld line during cooling, it may be possible to achieve a very smooth weld line, as well as a smooth transition between unwelded sheet metal and the weld line.

Referring now to FIG. 2, a second embodiment of the transparent pressure foot 10 is shown. It will be noted that in the first embodiment, the laser head 12 included a conventional lens system (not shown) to focus the laser beam. In the second embodiment, shown in FIG. 2, the conventional lens system in the laser head 12 may be partially or totally eliminated by utilizing the pressure foot 10 itself to focus the laser beam 14. As shown in FIG. 2, the laser beam 14 enters the pressure foot 10 at the top surface 16, substantially unfocused. This is illustrated by the diagrammatic light rays 32 which are substantially straight lines. Since light rays 32 enter the pressure foot 10 perpendicular to the top surface 16 they will continue along a straight path within pressure foot 10. The majority of the light rays 32 will encounter a reflective portion 34 of pressure foot 10. Reflective portion 34 has a curved shape and is coated on the outside with a reflective coating such as silver. As a result, when light rays 32 encounter reflective coating 34 they are reflected by the reflective surface 34 according to the first law of reflection, which states that the angle of incidence is equal to the angle of reflection.

By carefully choosing the shape of the curve of surface 34, rays 32 may be reflected to a desired focal point 30. For example, as shown in FIG. 2, reflective surface 34 forms a section of a parabola. It will be appreciated that the exact form of the parabola of the reflective surface 34 will be chosen based on a number of factors. For example, where laser beam 14 enters the pressure foot 10 in a collimated state, as shown in FIG. 2, the central portion of laser beam 14 which passes directly to flat surface 24 without encountering curve surface 34 will not be focused to point 30. As a result, this portion of laser beam 14 will not significantly contribute to heating at point 30. To minimize this "lost energy" portion of laser beam 14, curve 34 may be chosen to reduce the width of flat portion 24. However, as the width of flat portion 24 is reduced, so is the surface area of contact with top sheet metal 18 reduced. Considerations of the required strength of the transparent pressure foot 10, as well as the desired depth of the focal point 30 below the flat portion 24 will thereby influence the exact curve chosen for reflective surface 34.

It should be noted that when viewed from above, focal point 30 in FIG. 2 will appear as a line parallel to the linear axis of transparent pressure foot lo. In conventional laser welding systems, as well as in the first embodiment of the present invention shown in FIG. 1, the laser beam 14 is instead focused to a point. Also, it will be appreciated that since laser beam 14 is circular, the intensity of the focal line will be greatest where it intersects a point through a diameter of laser beam 14 drawn perpendicular to the axis of the pressure foot 10. Consequently, as the laser head 12 moves along the transparent pressure foot 10, heating of the sheet metal 18 and 20 will increase to a maximum and then decrease along the line of the focus. These considerations, resulting from having a line of focus, as opposed to a point of focus, will come into play when determining the required energy of the laser beam 14, as well as the speed of the motion of the laser head to accomplish a given weld. In general, the decrease in intensity at focal point 30 resulting from the line of focus as opposed to a point of focus, is somewhat compensated for by the fact that the focused laser energy is in contact with a given point of the sheet metal 18, 20 for a longer period of time as the laser head 12 moves along pressure foot 10.

Referring now to FIG. 3, a third embodiment of the present invention is shown. Laser beam 14 enters the pressure foot 10 in a substantially collimated, unfocused, state as illustrated by parallel light beams 32. The top surface of pressure foot 10 includes a substantially flat portion 36 and a curved portion 38. The width of curved portion 38 is about the same as the width of laser beam 14. As a result, the light rays 32 of laser beam 14 will enter the transparent pressure foot at the curved portion 38 and will be refracted to a focal point 30. It will be appreciated by those skilled in the art that the exact shape of curve 38 may be chosen using conventional lens designing techniques to achieve a focal point 30 at any particular desired location. It should be noted that when pressure foot 10 is composed of quartz, curve 38 may be molded into pressure foot 10 avoiding the necessity of grinding to achieve curve 38. However, polishing may be still required to achieve the desired optical characteristics for curve 38. As with the second embodiment of FIG. 2, it will be appreciated that when viewed above, the laser beam 14 will be focused to a line of focus by curve surface 38. Accordingly, the design considerations discussed above resulting from the line of focus as opposed to a point of focus apply to the third embodiment shown in FIG. 3 as well.

It will be appreciated that pressure foot 10 may be manufactured in a number of shapes to conform to a desired shape of the sheet metal 18, 20. For example, rather than having a flat planar surface, it may be desired to weld sheet metal 18, 20 along a surface that includes curves or ridges. Thus, a continuous laser weld may be achieved by manufacturing pressure foot 10 to also conform to these curves and ridges in sheet metal 18, 20. Of course, during the welding process, the laser 12 will be required to also raise, lower and tilt to accommodate the curves and ridges and thereby maintaining the focal point at the desired location.

It will also be appreciated that by applying pressure with transparent pressure foot 10 directly to the weld point, the energy required to achieve the weld may thereby be reduced. Further, a continuous weld may be achieved over relatively long distances due to the lack of obstructions from a window in a clamp. Moreover, multiple pressure foots 10 may be placed together end-to-end to thereby provide an unlimited distance of continuous welding.

It should also be noted that while the above embodiments of the present invention illustrate the use of the transparent pressure foot 10 to weld sheet metal, the pressure foot 10 may also be used in other applications where pressure must be applied to a material at the point of application of laser energy. For example, pressure foot 10 in accordance with the present invention may be employed in applications where materials, such as sheet metal or other non-metal materials, are being cut.

The present invention has been described in an illustrative manner. It is to be understood that the terminology which has been used is intended to be in the nature of words of description rather than limitation. While the above description constitutes the preferred embodiments of the present invention, it will be appreciated that the invention is susceptable to modifications, variation and change without departing from the proper scope and the fair meaning of the accompanying claims.

What is claimed is:

1. An apparatus for applying laser energy having a predetermined frequency band to a material, said apparatus comprising:

a foot means for receiving and transmitting said laser energy to said material, said foot means having a contour surface for directing and concentrating portions of said laser energy received by said foot toward said material, said contour surface comprising side portions of said foot means and having generally the shape of a parabola in cross section, said contour surface including a reflective coating, said foot means being substantially transparent to said predetermined frequency band;

said foot means having a top surface for receiving said laser energy, and a bottom surface for making contact with said material, said bottom surface having a contour that conforms to a desired contour for said material wherein said laser energy exits said foot means through said bottom surface; and clamping means associated with said foot means for positioning said foot means in contact with said material and exerting a predetermined force thereon.

2. The apparatus of claim 1 wherein said contour surface is a lens at said top surface.

3. The apparatus of claim 1 wherein said top surface is substantially planar and is disposed substantially orthogonal to the axis of said laser energy.

4. The apparatus of claim 1 wherein said bottom surface is relatively flat.

5. The apparatus of claim 1 wherein said material includes first and second adjacent materials, and said predetermined force is applied to said first material by said foot to cause said first material to make intimate contact with said second adjacent material.

6. The apparatus of claim 5 wherein said laser energy has sufficient energy to cause said first and second materials to melt, and thereby weld said first and second materials together, whereby said materials will conform to said desired contour.

7. The apparatus of claim 5 wherein the melting point of said foot means is substantially higher than the melting point of said first and second materials.

8. The apparatus of claim 5 wherein said first and second materials are steel.

9. The apparatus of claim 1 wherein said foot means is generally solid and composed of quartz.

10. An apparatus for applying laser energy having a predetermined frequency band to a material, said apparatus comprising:

a foot means for receiving and transmitting said laser energy to said material, said foot means being substantially transparent to said predetermined frequency band;

said foot means having a top surface for receiving said laser energy and a relatively flat bottom surface, wherein said laser energy exits said foot means through said bottom surface;

said foot means having side contour surfaces, said contours being generally in the shape of a parabola in cross section, and said side portions being coded with a reflective coating for reflecting and focusing said laser energy to a point below said bottom surface; and clamping means associated with said foot means for positioning said foot means in contact with said material and exerting a predetermined force thereon.

* * * * *